United States Patent
Adkins et al.

(10) Patent No.: US 6,963,820 B2
(45) Date of Patent: Nov. 8, 2005

(54) ANALOG ENCODER METHOD FOR DETERMINING DISTANCE MOVED

(75) Inventors: Christopher Alan Adkins, Lexington, KY (US); Michael Anthony Marra, III, Lexington, KY (US); John Thomas Writt, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/695,235

(22) Filed: Oct. 28, 2003

(65) Prior Publication Data

US 2005/0091000 A1 Apr. 28, 2005

(51) Int. Cl.[7] ............................................. G01B 11/02
(52) U.S. Cl. ..................... 702/158; 702/150; 347/37; 347/19
(58) Field of Search ................................ 702/158, 150, 702/86, 94, 95, 97, 163; 347/37, 19

(56) References Cited

U.S. PATENT DOCUMENTS

| | | | |
|---|---|---|---|
| 5,310,272 A | 5/1994 | Nishizawa | |
| 5,439,301 A | 8/1995 | Nishizawa | |
| 6,292,117 B1 * | 9/2001 | Smith | 341/115 |
| 6,330,424 B1 | 12/2001 | Chapman et al. | |
| 6,355,927 B1 * | 3/2002 | Snyder | 250/231.13 |
| 6,454,474 B1 | 9/2002 | Lesniak et al. | |
| 6,660,996 B1 * | 12/2003 | Adkins et al. | 250/231.13 |
| 2002/0037191 A1 | 3/2002 | Lesniak et al. | |
| 2002/0039119 A1 | 4/2002 | Igarashi | |
| 2003/0128373 A1 | 7/2003 | Hayashi et al. | |

* cited by examiner

*Primary Examiner*—Michael Nghiem
*Assistant Examiner*—Stephen J. Cherry
(74) *Attorney, Agent, or Firm*—Thompson Mine, LLP

(57) ABSTRACT

A method for determining the distance moved by a component (such as a printer paper-feed roller) operatively coupled to an analog encoder having analog first and second output signals. At least one of a first inverse signal which is the inverse of the first output signal and a second inverse signal which is the inverse of the second output signal is calculated. The distance moved by the component from a previous position is calculated using one of an ascending or descending region of the first or second output signal, wherein the previous position is the position of the component corresponding to a crossover level of two signals chosen from the group consisting of the first output signal, the second output signal, and the at-least-one inverse signal.

12 Claims, 3 Drawing Sheets

ANALOG ENCODER METHOD FOR DETERMINING DISTANCE MOVED

TECHNICAL FIELD

The present invention relates generally to methods for determining the distance moved by a component, and more particularly to a method for determining the distance moved by a component which is operatively coupled to an analog encoder.

BACKGROUND OF THE INVENTION

Printers include those printers having a printer component, such as a printer paper-feed roller, whose position must be determined for accurate operation of the printer. Typically, an analog encoder having an encoder wheel is operatively connected to the printer paper-feed roller. A standard analog encoder produces channel A and B output signals in quadrature which are used to define a repeating cycle of four regions (a substantially linearly ascending region of the channel A output signal followed by a substantially linearly ascending region of the channel B output signal followed by a substantially linearly descending region of the channel A output signal followed by a substantially linearly descending region of the channel B output signal). The position of the component (i.e., the distance moved by the component) is determined at time t by the value of the output signal of the region corresponding to time t, as is known to those skilled in the art. The crossover from one region to the next or previous region occurs when the output signal of the one region reaches a fixed high crossover level or a fixed low crossover level as is understood by the artisan. The distance moved by the component while in a particular region is the distance moved from a previous position. The previous position is the position of the component when the appropriate output signal reached the appropriate fixed high or low crossover level to transition to the particular region. This method of calculating the distance moved by a component is subject to inaccuracies due to phase error between the two output signals, encoder resolution limits, encoder signal amplitude reduction at fast speeds, and defects such as inaccurate encoder mounting and ink spots on the encoder wheel.

What is needed is an improved method for determining the distance moved by a component which is operatively coupled to an analog encoder.

SUMMARY OF THE INVENTION

A broad method of the invention is for determining the distance moved by a component operatively coupled to an analog encoder having analog first and second output signals and includes steps a) and b). Step a) includes calculating at least one of a first inverse signal which is the inverse of the first output signal and a second inverse signal which is the inverse of the second output signal. Step b) includes calculating the distance moved by the component from a previous position using one of an ascending or descending region of the first or second output signal, wherein the previous position is the position of the component corresponding to a crossover level of two signals chosen from the group consisting of the first output signal, the second output signal, and the at-least-one inverse signal.

Several benefits and advantages are derived from the broad method of the invention. The broad method achieves a more accurate calculation of distance moved from a previous position by having the previous position depend on the crossover level of two of the first and second output and inverse signals instead of on a first or second output signal reaching a fixed high or fixed low crossover level. In one example, the broad method is not subject to inaccuracies from phase error between the two output signals and gives improved accuracy from inexpensive analog encoder resolution limits, analog encoder signal amplitude reduction at fast speeds, and defects such as inaccurate encoder mounting and ink spots on the encoder (e.g., on the encoder wheel for a rotary analog encoder) compared to conventional methods.

DETAILED DESCRIPTION

Figure 1:
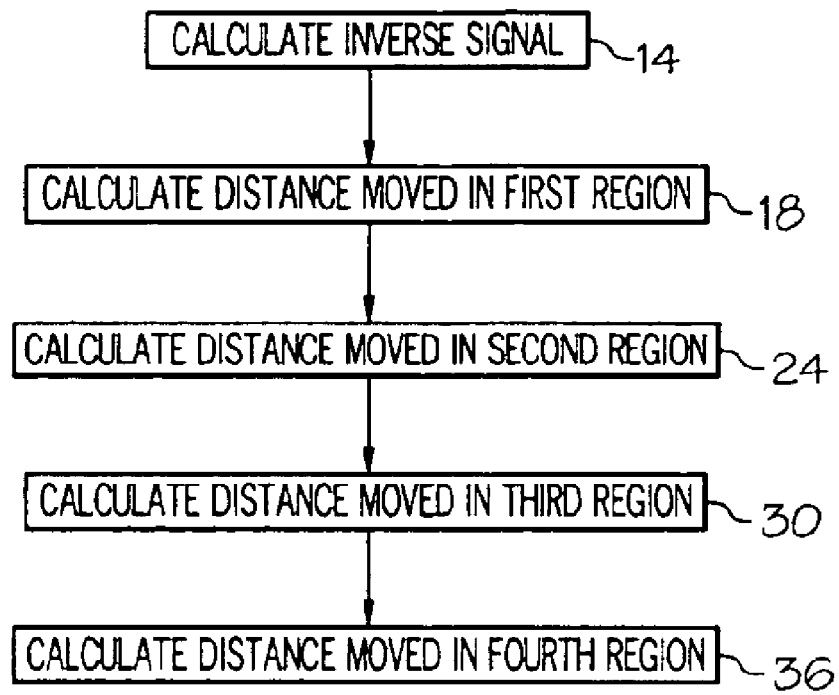
FIG. 1 is a block diagram of a first method of the invention for determining the distance moved by a component while moving in a forward direction.
Figure 2:
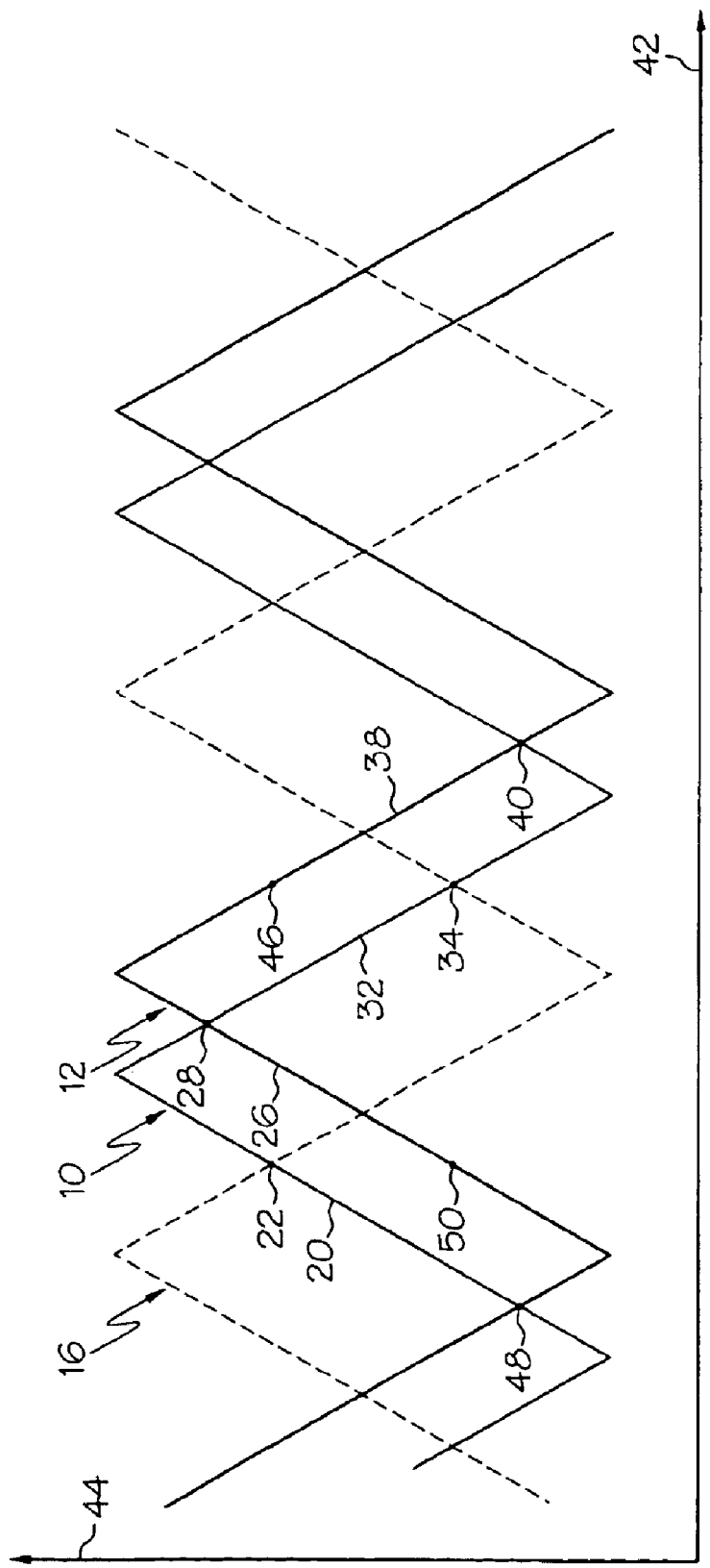
FIG. 2 is a graph of the first and second output signals (and the inverse of the second output signal) of a first embodiment of the analog encoder used in the first method of FIG. 1.

FIGS. 1–2 illustrate a first method of the invention which is for determining the distance moved by a component (and hence the position of the component) while moving in a forward direction and operatively coupled to an analog encoder having analog first and second output signals 10 and 12 (also known as analog encoder channel A and channel B signals) in substantial quadrature. The first method includes steps a) through e). Step a) is labeled as "Calculate Inverse Signal" in block 14 of FIG. 1. Step a) includes calculating an inverse signal 16 which is the inverse of the second output signal 12. Step b) is labeled as "Calculate Distance Moved In First Region" in block 18 of FIG. 1. Step b) includes calculating the distance moved by the component from a reference position using an ascending region 20 (also known as the first region) of the first output signal 10 until the first output signal 10 reaches a first high level 22 (which may also be called a first high amplitude value, a first high value, or a first high point). Step c) is labeled as "Calculate Distance Moved In Second Region" in block 24 of FIG. 1. Step c) includes then calculating the distance moved by the component from the position of the component when the first output signal 10 reached the first high level 22 using an ascending region 26 (also known as the second region) of the second output signal 12 until the second output signal 12 reaches a second high level 28. Step d) is labeled as "Calculate Distance Moved In Third Region" in block 30 of FIG. 1. Step d) includes then calculating the distance moved by the component from the position of the component when the second output signal 12 reached the second high level 28 using a descending region 32 (also known as the third region) of the first output signal 10 until the first output signal 10 reaches a first low level 34. Step e) is labeled as "Calculate Distance Moved In Fourth Region" in block 36 of FIG. 1. Step e) includes then calculating the distance moved by the component from the position of the component when the first output signal 10 reached the first low level 34 using a descending region 38 of the second output signal 12 until the second output signal 12 reaches a second low level 40 after which steps b) through e) are repeated wherein the reference position becomes the position of the component when the second output signal 12 reached the second low level 40. The first high level 22 is the crossover level of the ascending first output signal 10 and the inverse signal 16. The second high level 28 is the crossover level of the ascending second output signal 12 and the first output signal 10. The first low level 34 is the crossover level of the descending first output signal 10 and the inverse signal 16. The second low level 40 is the crossover level of the descending second signal 12 and the first output signal 10.

It is noted that in the first method the second output signal 12 is substantially ninety degrees behind in phase from the first output signal 10. It is also noted that in FIG. 2, the x-axis 42 is time and the y-axis 44 is amplitude. For the purpose of the first method, level 46 is assumed to be equal to the first high level 22, level 48 is assumed to be equal to the second low level 40, and level 50 is assumed to be equal to the first low level 34. Here, the ascending region 20 of the first output signal 10 is between level 48 and the first high level 22, the ascending region 26 of the second output signal 12 is between level 50 and the second high level 28, the descending region 32 of the first output signal 10 is between the second high level 28 and the first low level 34, and the descending region 38 of the second output signal 12 is between level 46 and the second low level 40.

In one employment of the first method, the crossover level corresponding to the first high level 22 is determined from at least one of the current value and the most recent previous value of the first output signal 10 and the inverse signal 16 when it has been determined that the ascending first output signal 10 crossed the inverse signal 16. In one variation, the first high level 22 is a function (such as the average) of the current value and the most recent previous value of the first output signal 10 and the inverse signal 16. In one modification, the average is the mean. In an additional variation, the first high level 22 is equal to (i.e., the function is a unity function) the current value or the most recent previous value of the first output signal 10 or the inverse signal 16. Other functions, including other types of averages, are left to the artisan. In this employment, the second high level 28 and the first and second low levels 34 and 40 are similarly determined.

In a first arrangement of the first method, the analog encoder is a rotary analog encoder. In a second arrangement, the analog encoder is a linear analog encoder. In one application of the first arrangement, the analog encoder has a rotatable encoder wheel, and the first and second high and low levels 22, 28, 34 and 40 for one revolution of the encoder wheel are previously measured and previously stored as a map in a memory. In one variation, a printer controller determines the target stopping location of the encoder wheel and the appropriate one or ones of the first and second high and low levels are chosen optimized for the final stopping position and set in a printer ASIC (application specific integrated circuit) and used for calculating distance moved. In one application of the first and/or the second arrangement, the first and second high and low levels 22, 28 34 and 40 are updated for changes in crossover levels (i.e., the first and second high and low levels are continuously updated based on the most recent measurements of signal crossovers).

In one illustration of the first method, the component is a printer paper-feed roller driven by a DC (direct current) motor. In another illustration, the component is a printhead carrier of a printer. In one design of the first method, the ascending regions and descending regions 20, 26, 32 and 38 are substantially linear regions. In one variation, the first and second output signals 10 and 12 are sawtooth signals as shown in FIG. 2. In another variation, not shown, the first and second signals have rounded peaks and valleys. Other illustrations, designs and variations are left to the artisan.

Figure 3:
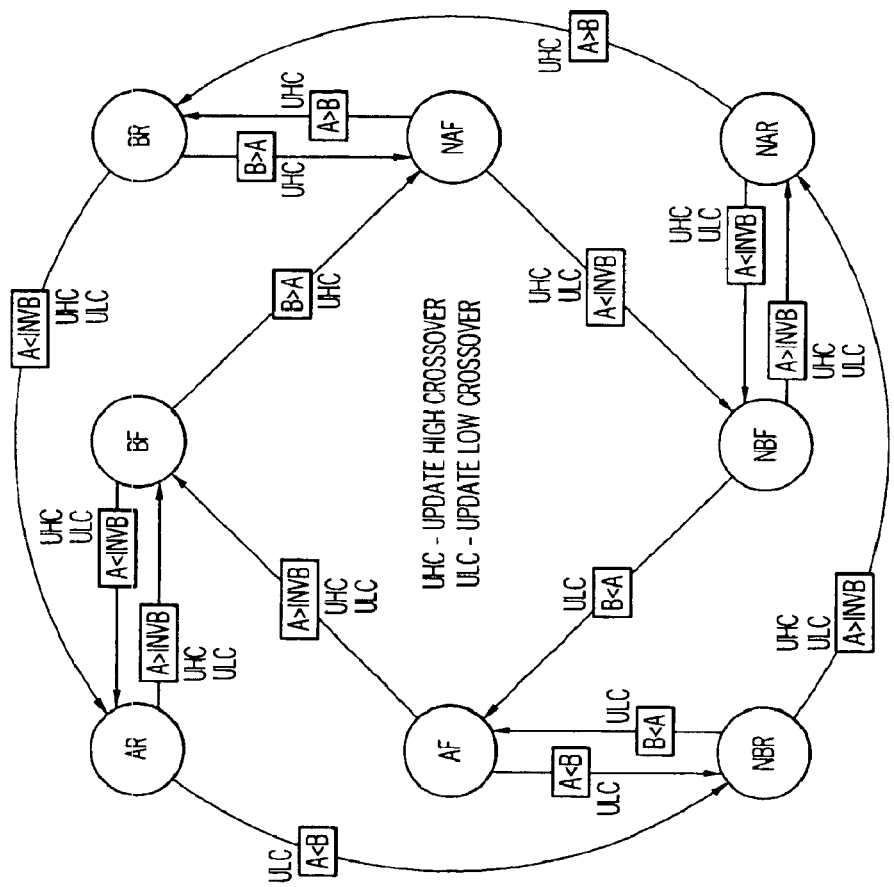
FIG. 3 is a diagram of a first embodiment of a state machine showing the transitions between the four regions of the first and second output signals of FIG. 2 and the updating of signal crossover levels used to define the previous position within a particular region from which the component has moved in a forward (and also in a reverse) direction in determining the distance moved by the component while in the particular region.

FIG. 3 is a diagram of a first embodiment of a state machine showing the transitions between the four regions (20, 26, 32 and 38) of the first and second output signals 10 and 12 of FIG. 2 and the updating of signal crossover levels (22, 28, 34 and 40) used to define the previous position within a particular region from which the component has moved in a forward (and also in a reverse) direction in determining the distance moved by the component while in the particular region. In FIG. 3, circle AF stands for forward motion in ascending region 20, circle BF stands for forward motion in ascending region 26, circle nAF stands for forward motion in descending region 32, and circle nBF stands for forward motion in descending region 38. Likewise, circle AR stands for reverse motion in ascending region 20, circle BR stands for reverse motion in ascending region 26, nAR stands for reverse motion in descending region 32, and circle nBR stands for reverse motion in descending region 38. "A" in any rectangular box such as the box containing "A<B" stands for the first output signal 10, "B" in any rectangular box stands for the second output signal 12, and "invB" in any rectangular box stands for the inverse signal 16. State machines, such as the state machine shown in FIG. 3, are understood by those skilled in the art.

The manner of calculating the inverse signal 16 is left to the artisan. In one example, electronic circuitry inverts the second output signal 12. In another example, a printer controller takes the second output signal 12 and subtracts it from the upper rail of the power supply to create the inversion. In an additional example, a printer controller determines the midpoint (mid level) of the second output signal 12 and inverts the signal about the midpoint to create the inversion. Other examples are left to the artisan.

The second method of the invention is broader than the previous first method and includes forward and reverse motion and includes changes in crossovers of any appropriate pair of signals (the signals being the first output signal 10, the second output signal 12, the inverse signal 16 which is the inverse of the second output signal, and the inverse of the first output signal which is not shown in the figures). It is noted that changes in crossover levels are due to changes in phase and/or amplitude of the signals from whatever cause such as, for example, from encoder resolution limits, encoder signal amplitude reduction at fast speeds, and defects such as inaccurate encoder mounting and ink spots on the encoder. In one enablement of the second method (which does not include using crossovers involving the inverse of the first output signal), one or more or all of the following signal crossover levels are considered to be variable: level 48 (also shown at a different time as level 40 in FIG. 2) when transitioning between region IV (labeled as 38) and region I (labeled as 20); level 22 and level 50 when transitioning between region I (labeled as 20) and region II (labeled as 26); level 28 when transitioning between region II (labeled as 26) and region III (labeled as 32); and level 34 and level 46 when transitioning between region III (labeled as 32) and region IV (labeled as 38). In one variation, crossover level 50 is determined from at least one of the current value and the most recent previous value of the second output signal 12 when transitioning between regions I and II. Likewise, in this variation, crossover level 46 is determined from at least one of the current value and the most recent previous value of the second output signal 12 when transitioning between regions III and IV. In one modification, level 50 is assumed to be equal to the first low level 34 with the value representing both levels 50 and 34 updated with the calculated value of level 50 and then with the calculated value for level 34. Other enablements (including those using crossovers involving the inverse of the first output signal with or without involving the inverse signal 16) and variations and modifications thereof are left to the artisan as well as extensions to analog encoders having three or more output signals.

Figure 4:
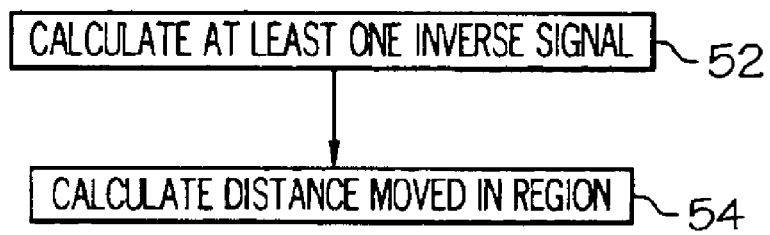
FIG. 4 is a block diagram of a second and broad method of the invention.

The second method is for determining the distance moved by a component operatively coupled to an analog encoder having analog first and second output signals and includes steps a) and b). Step a) is labeled as "Calculate At Least One Inverse Signal" in block 52 of FIG. 4. Step a) includes calculating at least one of a first inverse signal which is the inverse of the first output signal and a second inverse signal which is the inverse of the second output signal. Step b) is labeled as "Calculate Distance Moved In A Region" in block 54 of FIG. 4. Step b) includes calculating the distance moved by the component from a previous position using one of an ascending or descending region of the first or second output signal, wherein the previous position is the position of the component corresponding to a crossover level of two signals chosen from the group consisting of the first output signal, the second output signal, and the at-least-one inverse signal.

Applicants tested a six signal crossover level embodiment of the second method using an inexpensive analog encoder and found that it virtually eliminated encoder-caused position error as verified by comparing the calculated distance moved to that calculated when using an expensive laser analog encoder.

The previous applications, arrangements, illustrations, and designs, etc. of the first method are equally applicable to the second method. In one implementation of the second method, the crossover level is determined from at least one of the current value and the most recent previous value of at least one of the two signals when it has been determined that the two signals crossed. In one application of the second method, the crossover level is updated each time there is a crossover of the two signals. In one performance of the second method, there is also included the step of calculating the distance moved by the component using a different one of the ascending or descending region of the first or second output signal upon a crossover of two signals chosen from the group consisting of the first output signal, the second output signal, and the at-least-one inverse signal. In one operation of the second method, the component is adapted to move in a forward direction and in a reverse direction.

Several benefits and advantages are derived from the broad method of the invention. The broad method achieves a more accurate calculation of distance moved from a previous position by having the previous position depend on the crossover level of two of the first and second output and inverse signals instead of on a first or second output signal reaching a fixed high or fixed low crossover level. In one example, the broad method is not subject to inaccuracies from phase error between the two output signals and gives improved accuracy from inexpensive analog encoder resolution limits, analog encoder signal amplitude reduction at fast speeds, and defects such as encoder mounting and ink spots on the encoder (e.g., on the encoder wheel for a rotary analog encoder) compared to conventional methods.

The foregoing description of several methods of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for determining the distance moved by a component while moving in a forward direction and operatively coupled to an analog encoder having analog first and second output signals in substantial quadrature comprising the steps of:
    a) calculating an inverse signal which is the inverse of the second output signal;
    b) calculating the distance moved by the component from a reference position using an ascending region of the first output signal until the first output signal reaches a first high level;
    c) then calculating the distance moved by the component from the position of the component when the first output signal reached the first high level using an ascending region of the second output signal until the second output signal reaches a second high level;
    d) then calculating the distance moved by the component from the position of the component when the second output signal reached the second high level using a descending region of the first output signal until the first output signal reaches a first low level; and
    e) then calculating the distance moved by the component from the position of the component when the first output signal reached the first low level using a descending region of the second output signal until the second output signal reaches a second low level after which steps b) through e) are repeated wherein the reference position becomes the position of the component when the second output signal reached the second low level, and
    wherein the first high level is the crossover level of the ascending first output signal and the inverse signal,
    wherein the second high level is the crossover level of the ascending second output signal and the first output signal,
    wherein the first low level is the crossover level of the descending first output signal and the inverse signal, and
    wherein the second low level is the crossover level of the descending second output signal and the first output signal.

2. The method of claim 1, wherein the crossover level corresponding to the first high level is determined from at least one of the current value and the most recent previous value of the first output signal and the inverse signal when it has been determined that the ascending first output signal crossed the inverse signal.

3. The method of claim 1, wherein the analog encoder has a rotatable encoder wheel, and wherein the first and second high and low levels for one revolution of the encoder wheel are previously measured and previously stored as a map in a memory.

4. The method of claim 1, wherein the first and second high and low levels are updated for changes in crossover levels.

5. The method of claim 1, wherein the analog encoder is a rotary analog encoder.

6. The method of claim 1, wherein the analog encoder is a linear analog encoder.

7. The method of claim 1, wherein the component is a printer paper-feed roller driven by a DC (direct current) motor.

8. The method of claim 1, wherein the component is a printhead carrier of a printer.

9. The method of claim 1, wherein the ascending regions and descending regions are substantially linear regions.

10. A method for determining the distance moved by a component operatively coupled to an analog encoder having analog first and second output signals comprising the steps of:
   a) calculating at least one of a first inverse signal which is the inverse of the first output signal and a second inverse signal which is the inverse of the second output signal; and
   b) calculating the distance moved by the component from a previous position using one of an ascending or descending region of the first or second output signal, wherein the previous position is the position of the component corresponding to a crossover level of two signals chosen from the group consisting of the first output signal, the second output signal, and the at-least-one inverse signal, wherein the analog encoder has a rotatable encoder wheel, and wherein the crossover levels of the two signals for one revolution of the encoder wheel are previously measured and previously stored as a map in a memory.

11. A method for determining the distance moved by a component operatively coupled to an analog encoder having analog first and second output signals comprising the steps of:
   a) calculating at least one of a first inverse signal which is the inverse of the first output signal and a second inverse signal which is the inverse of the second output signal; and
   b) calculating the distance moved by the component from a previous position using one of an ascending or descending region of the first or second output signal, wherein the previous position is the position of the component corresponding to a crossover level of two signals chosen from the group consisting of the first output signal, the second output signal, and the at-least-one inverse signal, wherein the analog encoder is a rotary analog encoder.

12. A method for determining the distance moved by a component operatively coupled to an analog encoder having analog first and second output signals comprising the steps of:
   a) calculating at least one of a first inverse signal which is the inverse of the first output signal and a second inverse signal which is the inverse of the second output signal; and
   b) calculating the distance moved by the component from a previous position using one of an ascending or descending region of the first or second output signal, wherein the previous position is the position of the component corresponding to a crossover level of two signals chosen from the group consisting of the first output signal, the second output signal, and the at-least-one inverse signal, wherein the analog encoder is a linear analog encoder.

* * * * *